UNITED STATES PATENT OFFICE

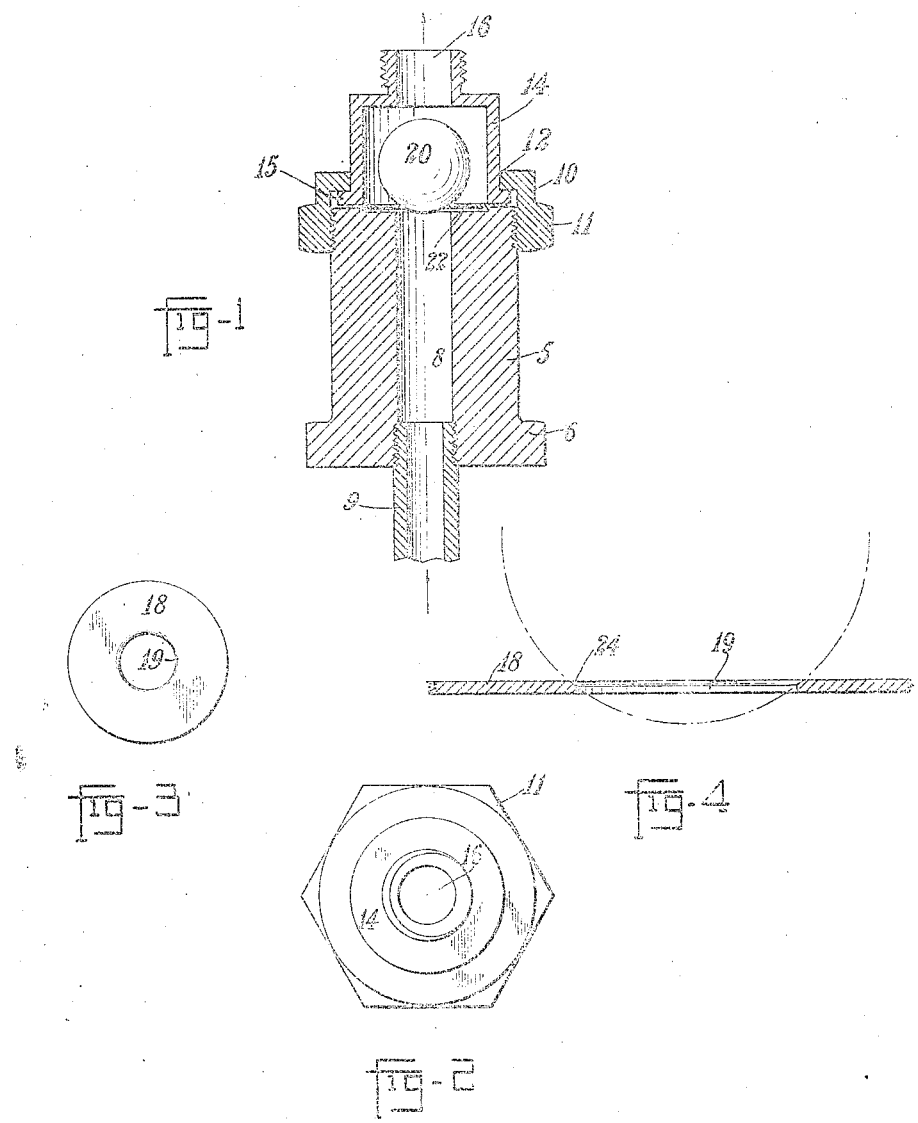

GEORGE A. GASE, OF CLEVELAND, OHIO, ASSIGNOR, BY MESNE ASSIGNMENTS, TO THE ICELESS MACHINE COMPANY, OF CLEVELAND, OHIO, A CORPORATION OF OHIO.

CHECK-VALVE.

1,164,342.   Specification of Letters Patent.   Patented Dec. 14, 1915.

Application filed June 11, 1914. Serial No. 844,560.

*To all whom it may concern:*

Be it known that I, GEORGE A. GASE, a citizen of the United States, residing at Cleveland, in the county of Cuyahoga and State of Ohio, have invented certain new and useful Improvements in Check-Valves, of which the following is a full, clear, and exact description, reference being had to the accompanying drawings.

This invention relates to check valves, and has for its object to provide a simple, efficient check valve which may be cheaply manufactured.

Another object is to provide such a check valve having a valve member and seat member, one of such members being automatically conformable to the other, whereby liquids or gases of high rarity or tenuity are prevented from leaking therethrough.

Another object is to so arrange the valve parts that the valve member and its seat are readily accessible for cleaning, replacing of the parts, etc.

My invention is hereinafter more fully described in connection with the drawings and the essential characteristics are set forth in the claims.

Figure 1 is a vertical central section through my check valve; Fig. 2 is a plan of the same; Fig. 3 is a plan of the flexible diaphragm forming the seat; Fig. 4 is an enlarged cross section of such diaphragm showing the position of the ball, and the surface on which it rests.

Referring to these drawings by reference numerals, 5 indicates the body, which may be of any desired form. As shown, it is substantially cylindrical, being provided with an angular portion 6 at its lower end and having therethrough a passage 8 to which fluids is led by means of a suitable pipe 9. Preferably at the upper portion, are provided threads which receive a threaded flanged collar 10 having an angular portion 11, having an inwardly turned flange 12. Secured to the body portion of this flange 12 is a chambered member 14, having an outwardly turned flange 15 coöperating with the flange 12 and which, as shown, is provided with an upwardly extending nipple 16, having suitable external threads to which may be secured a suitable fitting for a pipe leading the fluid away from the valve.

Between the chambered member 14 and the body 5, is clamped the periphery of a flexible metal disk 18, having a central opening 19 through which the fluid passes, and which is closed to check the back flow of fluid by a ball 20. This ball 20 preferably fits into this opening, resting on a chamfered edge formed by grinding with the ball itself or a ball of exactly the same size. Just beneath the disk 18, the head 5 has a cut-away portion 22, allowing the diaphragm to spring slightly.

Now it will be seen that fluid may pass through the check valve by raising the ball 20 from its seat and passing out of the nipple 16, but is prevented from passing backwardly through the valve by the ball seating itself in the opening in the diaphragm. The flexibility of this diaphragm provides for its automatically adjusting itself to any irregularity, however slight, in the spherical surface of the ball 20, allowing this ball to be very tightly seated. The cutaway portion 22 provides a space allowing the spring movement of this diaphragm, but the distance between this diaphragm and the shoulder formed by this cutaway portion is preferably only sufficient to allow this necessary adjusting movement, and under exceeding pressure, may act to einforce the diaphragm which may be pressed against it, thereby preventing the diaphragm springing such an amount as to distort or break the same.

Heretofore in ball valves, there has been great difficulty in providing a valve which is absolutely tight, as it is impractical to provide or secure balls which are absolutely spherical, and the slight irregularities in the spherical surface leave a very slight opening between the ball and a rigid seat, which permits the passage of rare fluids, under pressure. My device obviates this difficulty. It will be noted from Fig. 4 that the ball seats on a very narrow seat indicated at 24, which conforms to the surface of the ball, yet provides sufficient contact to form a tight closure.

It is obvious that the head 5 and chambered member 14 may be of any convenient form desired, and the diaphragm may be secured in position in any desired manner.

A simple and efficient valve, which when closed is absolutely tight, may be provided by using such a ball and flexible diaphragm as is herein described.

Having thus described my invention, what I claim is:

1. In a check valve, the combination of a suitable casing, a flexible diaphragm extending across the casing and having a round hole through it, a free ball of larger diameter than the hole loosely confined between one side of the diaphragm and the casing, said ball being adapted to seat in the round hole and having its movement limited so that its center will not pass beyond the edge of the hole.

2. In a check valve, the combination with a casing, a chambered member secured thereto, a flexible diaphragm clamped at its margin between the chambered member and the valve body and having a central opening, and a ball fitted into said opening and ground in place providing a chamfered edge on said opening, said chambered member loosely surrounding the ball and allowing clearance around it while preventing its center passing beyond the periphery of the opening.

3. In a check valve, the combination with a valve body and a chambered member secured thereto, of a flexible planar circular flexible diaphragm clamped between the body and this chambered member and having a central opening, and a ball closing said opening, said body being cut away on the side of the diaphragm opposite the ball to allow a movement of the diaphragm but forming an abutment limiting its movement.

4. In a check valve, the combination of a body having a passageway through it, a flexible planar diaphragm adapted to extend across the body and having a hole registering with said passageway, there being an annular recess in the body around the passageway and adjacent to the diaphragm, a ball on the other side of the diaphragm from said recess adapted to seat in the hole in the diaphragm and close it, the edge of the diaphragm hole being chamfered, a casing loosely containing the ball, and means for clamping the casing toward said body on the interposed edge of the diaphragm.

In testimony whereof, I hereunto affix my signature in the presence of two witnesses.

GEO. A. GASE.

Witnesses:
ALBERT H. BATES,
JUSTIN W. MACKLIN.